United States Patent [19]

Dervy

[11] 4,244,661
[45] Jan. 13, 1981

[54] FASTENER MEANS AND JOINT FOR LAMINATES

[75] Inventor: Aram J. Dervy, Santa Monica, Calif.

[73] Assignee: McDonnell Douglas Corporation, Long Beach, Calif.

[21] Appl. No.: 59,535

[22] Filed: Jul. 23, 1979

[51] Int. Cl.³ .............................................. F16B 9/00
[52] U.S. Cl. ................................... 403/243; 403/279; 403/388
[58] Field of Search ............... 403/243, 388, 279, 179, 403/280, 281, 371; 85/4

[56] References Cited

U.S. PATENT DOCUMENTS

| | | | |
|---|---|---|---|
| 2,500,909 | 3/1950 | Winby | 403/279 X |
| 3,222,449 | 5/1967 | Becker | 403/388 |
| 3,271,058 | 9/1966 | Anderson | 85/4 |
| 3,298,725 | 1/1967 | Boteler | 403/388 X |
| 3,949,535 | 4/1976 | King | 403/388 |
| 3,962,843 | 6/1976 | King | 403/243 |
| 4,076,430 | 2/1978 | Crook | 403/273 X |

FOREIGN PATENT DOCUMENTS 129705 10/1950 Sweden ............................... 403/371

*Primary Examiner*—James Kee Chi
*Attorney, Agent, or Firm*—George W. Finch; Walter J. Jason; Donald L. Royer

[57] ABSTRACT

A galvanically compatible flanged sleeve is inserted within a close fitting hole in a structural joint wherein at least one of the structural members is a composite laminate. The sleeve is then expanded outwardly into a high interference fit by the insertion of a fastener therethrough. The sleeve may be of the split type and when such is used, a washer can be provided underneath the flange to prevent damage to the underlying laminate surface. Teflon coated shims may be placed between the mating surfaces of the adjacent structural members heldtogether by the joint when the stress excursions are to be applied to high levels and/or with frequency. Joints so formed of graphite/epoxy laminate have fatigue strengths approaching the ultimate static strength of the joint.

8 Claims, 4 Drawing Figures

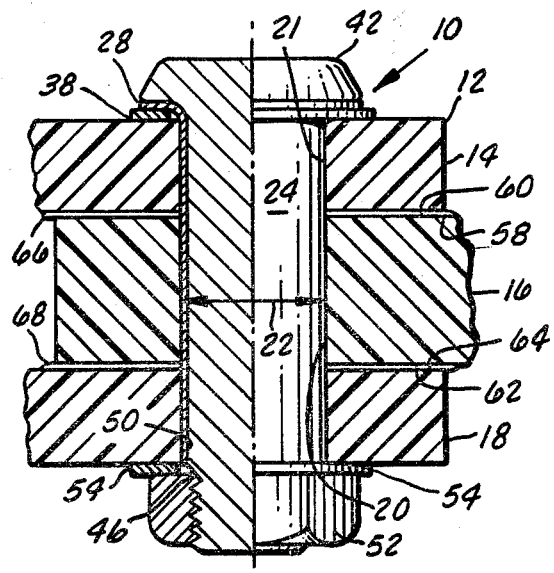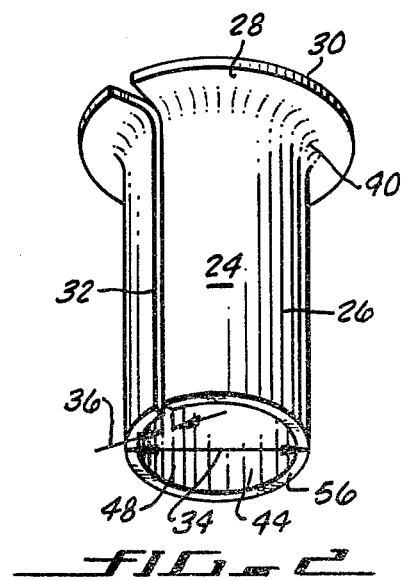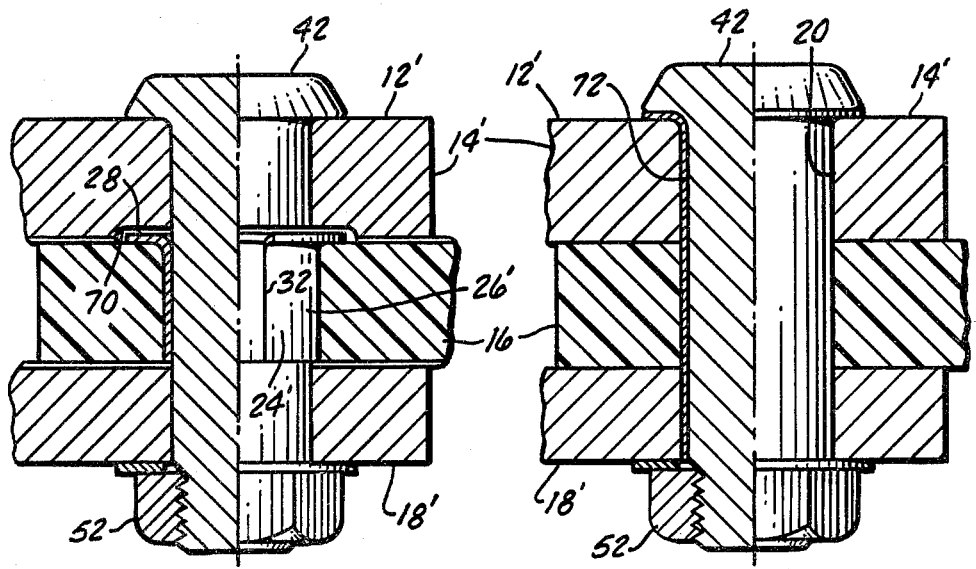

FASTENER MEANS AND JOINT FOR LAMINATES

CROSS-REFERENCE TO RELATED PATENTS

The present patent is related to U.S. Pat. Nos. 3,434,327 which issued Mar. 25, 1969, 3,945,695 which issued Mar. 23, 1976 and 3,951,561 which issued Apr. 20, 1976 all by Eugene R. Speakman and all assigned to McDonnell Douglas Corporation. The information in these patents is incorporated by reference as though fully set forth herein below.

BACKGROUND OF THE INVENTION

Generally, in joints having multiple fasteners it is desirable that the fasteners fit net or be at an interference fit within the fastener holes since this tends to better distribute the load among adjacent fasteners. This is particularly true when the materials to be joined have very little ductility, such as fiberglass/epoxy and graphite/epoxy laminates, for such materials unlike aluminum and other structural materials used in the aircraft industry, do not help distribute the load by plastically deforming to relieve the stresses. Such yielding helps to distribute the load more evenly among the fasteners in metallic structures and as a consequence reduces the probability of premature failure.

In joints which are subjected to tension-compression fatigue loads, if a clearance fit is used, the bolt shank will pound the composite within the hole at each load reversal resulting in elongated holes. This leads to possible joint failure. This pounding and hole elongation does not occur with interference fit fasteners.

Although as noted, interference fit is desirable, the present practice of obtaining interference fit bolted joints in laminates leads to some difficulties, because laminates tend to delaminate when fasteners are installed in net or interference fit. This delamination is caused by the pushing action of the cylindrical surface of the fastener as the fastener is forced in the hole. This forcing tends to delaminate the last plies as the fastener emerges on the far side of the fastener hole. Special means must be provided to prevent this, usually taking the form of a metal backup plate. However, there are many instances where limited access to the back side of a joint does not permit the use of backup plates or makes their use extremely inconvenient.

Joints incorporating laminates and especially graphite/epoxy laminates must be put together carefully using the right combination of materials since contact between incompatible materials will result in the formation of a galvanically active joint which may lead to failure. Therefore, there has been a need to provide a joint, especially for graphite/epoxy structures which is galvanically inactive and results in a long life without deterioration of either the static or fatigue strength of the joint. The joint fabrication should be amenable to a mass production environment and should be relatively inexpensive both in labor time and consumables.

BRIEF DESCRIPTION OF THE PRESENT INVENTION

In the present joint, the structure to be fastened together is clamped together and a hole of a predetermined diameter is drilled and reamed through the structural stackup. A flanged split sleeve, such as those shown in U.S. Pat. No. 3,566,662, which are commercially available from Industrial Wire and Metal Forming Inc. of Tukwila, Washington, is then inserted in the hole with the split of the sleeve and the diameter of the sleeve being chosen so that insertion of the sleeve within the hole preferably closes the split. The split within the flange would gouge the member against which it would be pressing against once the bolt is inserted and torqued-up. To prevent this, a washer is placed under the flange. Another function of the washer is that it reduces the bearing stress because washer area is larger than that of the sleeve flange. When a metallic member is adjacent the flange, means such as radius stress coining as discussed in U.S. Pat. No. 3,945,695 can be employed to improve the fatigue strength adjacent the hole and provide relief for the sleeve intersection. A fastener constructed from relatively hard material and having a tapered lead-in and a predetermined shank diameter is then drawn, pushed or hammered through the sleeve and appropriate tension applying means are applied to the other end whether they be a nut, a Huckbolt lock-collar or the like. The sleeve usually is constructed from stainless steel and the resultant joint with proper choices of washers and nuts is galvanically inactive in graphite/epoxy laminates while providing an interference fit in the hole within the structures. When large loads or loads at high frequency rates are expected to be applied across the joint, Teflon coated and baked on stainless steel shims can be placed at the interface between mating faces of the structural members to prevent freting. The Teflon also can be placed directly on the mating faces.

It is therefore an object of the present invention to provide a joint for laminates which provides a fatigue strength which is equal or better than an interference fit joint without use of a sleeve.

Another object is to provide a primary structural joint for laminates which is relatively easy and economical to construct in a production situation.

Another object is to provide an interference fit fastener system whose proper installation can be inspected easily for currect construction.

These and other objects and advantages of the present invention will become apparent to those skilled in the art after considering the following detailed specification which discloses preferred embodiments thereof in conjunction with the accompanying drawing wherein:

BRIEF DESCRIPTION OF THE DRAWING

FIG. 1 is a cross-sectional view through a stacked graphite/epoxy structural joint having the fastener system of the present invention installed therein, the fastener system being shown in partial cross-section;

FIG. 2 is perspective view of the split sleeve used in the joint of FIG. 1;

FIG. 3 is a cross-sectional view similar to FIG. 1 of a modified version of the present joint; and FIG. 4 is a view similar to FIGS. 1 and 3 of a modified version of the present joint using a solid sleeve rather than a split sleeve.

DETAILED DESCRIPTION OF THE SHOWN EMBODIMENTS

Referring to the drawing, more particularly by reference numbers, number 10 in FIG. 1 refers to a joint constructed according to the present invention. The joint is shown applied to a structure 12 including three graphite/epoxy structural members 14, 16 and 18. The joint 10 is constructed by clamping the members 14, 16 and 18 together in their desired configuration. A cylindrical hole 20 then is drilled and reamed therethrough so as to have an inner surface 21 of a predetermined diameter 22. A split sleeve 24 having a cylindrical body portion 26, a radial flange 28 at one end 30 and a longitudinal split 32 is placed within the hole 20. The outer diameter 34 of the sleeve 24 and the width 36 of the split 32 are chosen so that when the sleeve 24 is inserted in the hole 20, the split 32 essentially is closed. A washer 38 is placed between the flange and the member 14 to prevent damage to the structure 12 adjacent the hole 20 by the portion of the split 32 that traverses the transition 40 between the cylindrical body 26 and the flange 28 of the sleeve 24. Otherwise the transition 40 is pressed against the member 12 when a bolt 42 is inserted in the hole 20 and is torqued up.

The bolt or other similar type fastener 42 is forced through the interior 44 of the sleeve 24. The fastener 42 includes a tapered lead-in 46 which engages and expands the inner cylindrical surface 48 of the sleeve 24 and thereby expands the sleeve 24 and the hole 20 in which is in inserted to establish an interference fit between the sleeve 24 and the inner surface 21 of the hole 20 without delaminating of the members 14, 16 and 18 especially adjacent the exit 50 of the hole 20. Typical values of interference for various fastener sizes in a metal joint are shown in the following Table.

| STANDARD INTERFERENCE FIT FOR PROTRUDING HEAD FASTENERS | |
|---|---|
| Nominal Bolt Diameter | Final Hole Diameter |
| (inches) | |
| 5/32 | .1610-.1635 |
| 3/16 | .1850-.1880 |
| 1/4 | .2450-.2480 |
| 5/16 | .3075-.3105 |
| 3/8 | .3700-.3730 |
| 7/16 | .4325-.4355 |
| 1/2 | .4950-.4980 |

Generally in bolted joints within metallic structures, the fit of bolts within the holes is standardized (see Table above). This standardization specifies the degree of interference fit for each standard bolt diameter and can be used for composites. The amount of interference shown in the Table particularly applies if the joint consists of both laminate and metal members. If the joint consists of only of composite members, then the degree of interference fit can be increased by a factor of 1.5. This increase is possible because the resin in the composite is soft, and can tolerate larger interference without failure. With a larger interference fit standard, there is more leeway in the drilling/reaming operation to assure that some interference still will remain if there is a machining error. This increase in interference also assures electrical continuity across the joint, graphite/epoxy structures not providing a good electrical path otherwise.

Assume now that for a standard fastener diameter D, the standard interference called out hole diameter is $D_1$. Then the hole diameter $D_2$ to be drilled and reamed to allow for the presence of the sleeve in the hole as well as have the desired standard interference fit is $D_2 = D_1 + 2t$, where t = sleeve wall thickness.

If a torqued fastener, such as the bolt 42 and a nut 52 are to be used, a washer 54 is used in conjunction with the nut 52. When the joint is going to be subjected to vibratory stresses where fretting between the adjacent surfaces 58 and 60 and 62 and 64 of the members 14, 16 and 18 might occur, baked on Teflon coatings or Teflon coated stainless steel shims 66 and 68 can be applied therebetween prior to clamp up, drilling and reaming.

Structures such as shown in FIG. 1 have exceeded an equivalent 20 year fatigue life when stressed to oscillating loads of 81% of the ultimate static strength of the joint 10.

Modified structures are shown in FIGS. 3 and 4. In both cases, the structure 12' includes metallic members 14' and 18'. When metallic members are used in combination with graphite/epoxy members care must be taken to prevent galvanic action. Also aluminum and titanium metallic members are sensitive to the gap formed by the split 32 in the sleeve 24. This sensitivity can be reduced greatly by stress coining the hole as shown in U.S. Pat. No. 3,951,561 prior to insertion of the sleeve 24 and using the configuration shown in FIG. 1. Another solution is shown in FIG. 3 wherein the sleeve 24' has a reduced length body 26', it only extending through the graphite/epoxy member 16. When this is done, the structural member 14' adjacent the flange 28 includes a relief 70 which is formed by spot facing and in some instances single side pad coining as shown in U.S. Pat. No. 3,434,327. When this configuration is used, a washer 38 is not required since the flange 38 of the sleeve 24' is not forcefully retained against the member 16 and therefore its split 32 has no tendency to gouge the material. The fastener 42 thereafter is installed as if the sleeve 24' extended completely through the structure 12' to establish an interference fit in the member 16, the members 14' and 18' being protected from fatigue by stress coining.

In FIG. 4 the problem of multi-material structures is solved by using a non-split sleeve 72 which in other aspects is similar to the split sleeves 24 and 24'. When a non-split sleeve 72 is used, the member 18' prevents delamination of the laminate member 16 by the sleeve 72 as it is inserted forcefully in the hole 20. The sleeve 72 is expanded thereafter by insertion of the bolt 42. The sleeve configuration as shown in FIG. 4 requires closer manufacturing tolerances than the configuration shown in FIG. 1. The sleeve 72 like sleeves 24 and 24' can be used to prevent contact between galvanically active materials.

Thus there has been shown and described a novel fatigue fastener system and jointed structures which fulfill all the objects and advantages sought therefor. Many changes, modifications, variations and other uses and applications of the subject invention however will become apparent to those skilled in the art after considering this specification and the accompanying drawing. All such changes, modifications, variations and other uses and applications which do not depart from the spirit and scope of the invention are deemed to be covered by the invention which is limited only by the claims which follow.

What is claimed is:
1. A structural joint including:
 a first structural member contructed from composite material, said first structural member defining a bore of predetermined inner diameter therethrough;
 a second structural member, said second structural member defining a cylindrical bore therethrough having a predetermined inner diameter, said first and second structural members being positioned so that said bores of said first and second structual members are axially aligned;

a sleeve having a hollow cylindrical portion with an inner and outer diameter, first and second ends, a flange on said first end thereof and a longitudinal slit through said hollow cylindrical portion and said flange thereof, said sleeve being inserted in said cylindrical bore of at least said first structural member; and a fastener having a cylindrical shank of predetermined diameter positioned in said sleeve, said predetermined diameter of said cylindrical shank being sized to expand said sleeve into interference fit with said cylindrical bore of a least said first structural member.

2. The structural joint as defined in claim 1 wherein said slit has a predetermined width, said slit and said outer diameter of said sleeve, and said predetermined inner diameter of said bore in at least said first structural member being chosen so that said circumference of said sleeve minus the width of said slit is generally equal to the circumference of said bore, said sleeve having a transition portion between said flange and said hollow cylindrical portion through which said slit extends.

3. The structural joint as defined in claim 2 wherein said first structural member has an outer surface adjacent said bore, said flange being positioned adjacent said outer surfce of said first structural member, said structural joint includes a washer between said flange and said outer surface of said first structural member, said washer having a predetermined thickness in relation to the size of said transition portion whereby said slit at said transition portion is held out of engagement with said first structural member to prevent said slot from gouging said first structural member.

4. The structural joint as defined in claim 3 wherein said bore through said first and second structural members has a predetermined length and said second structural member has an inner and outer surface, said sleeve cylindrical portion extending through said bore so that said second end portion thereof is substantially even with said outer surface of said second structural member.

5. The structural joint as defined in claim 1 wherein said first and second structural members are constructed from graphite epoxy composite material.

6. The structural joint as defined in claim 2 wherein said diameter of said shank, said sleeve diameters, and said bore diameter are chosen so that a predetermined interference exists between said sleeve and said bore.

7. The structural joint as defined in claim 6 wherein said interference fit is 1.5 to 6.75 thousandths of an inch whereby said interference fit is about 1.5 times the standard interference fit for metallic structures.

8. The structural joint as defined in claim 2 wherein said first structural member is constructed for graphite/epoxy and has an outer surface adjacent said bore, said flange being adjacent said outer surface of said first structural member, further including a third structural member defining a portion of said bore therethrough, said first structural member being positioned between said second and third structural members, said sleeve extending through said first structural member, said fastener extending through said first, second and third structural members and said second and third structural members being metallic.

* * * * *